Oct. 8, 1940. F. J. ADDIS ET AL Re. 21,592

MERCHANDISE PACKAGE AND DISPLAY

Original Filed Nov. 14, 1936

INVENTORS
FRANK J. ADDIS
PAUL P. ADDIS
BY
Howard E. Thompson
ATTORNEY

Reissued Oct. 8, 1940 Re. 21,592

UNITED STATES PATENT OFFICE 21,592

MERCHANDISE PACKAGE AND DISPLAY

Frank J. Addis and Paul P. Addis, Brooklyn, N. Y.

Original No. 2,147,135, dated February 14, 1939, Serial No. 110,828, November 14, 1936. Application for reissue May 13, 1940, Serial No. 334,984

7 Claims. (Cl. 206—44)

This invention relates to package boxes used for the packing, shipment as well as display of articles of merchandise, especially in the class of candle holders, candles and cake ornaments or decorations; and the object of the invention is to provide a package of the class described consisting of an inner article supporting box part comprising a single sheet of material folded to form a supporting unit consisting of top, bottom and intermediate walls and side walls; a further object being to provide a box part of the class described having means adjacent outer edge portions thereof for supporting candles and candle holders in predetermined arrangement to produce an attractive display of the merchandise, and further to the provision of means for representing the arrangement of the candle holders and other parts upon a cake to visualize to the purchaser the manner of using the merchandise; a further object being to provide another box part in the form of a rectangular sleeve adapted to fit over the first named box part to support the same in position and to form above the top wall of the inner box part a chamber in which merchandise is displayed; a still further object being to provide a characterized sheet upon the upper surface of the inner box part to locate or position the arrangement of the merchandise placed on display; a further object being to provide a transparent sheet or covering forming a closure and protector to the articles arranged on display, and also a means for preventing displacement of predetermined articles from the container when the cover proper of the container is removed; and with these and other objects in view, the invention consists in a package or container of the class and for the purpose specified, which is simple in construction, efficient in use, and which is constructed as hereinafter described and claimed.

The invention is fully disclosed in the following specification, of which the accompanying drawing forms a part, in which the separate parts of our improvements are designated by suitable reference characters in each of the views, and in which.

Figure 1:
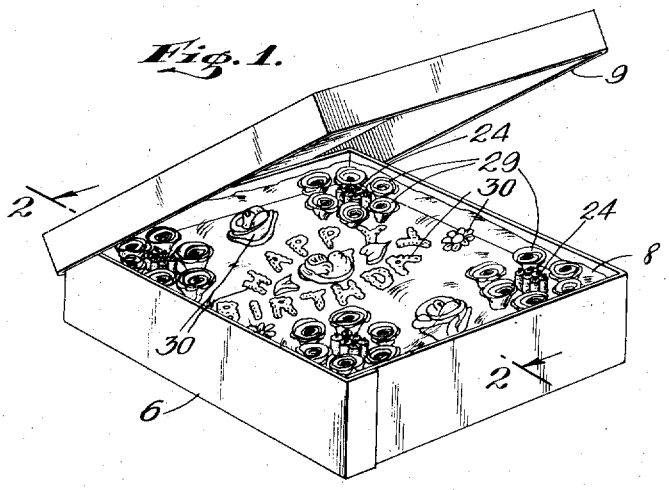
Fig. 1 is a perspective view of one form of package or container which we employ, showing the cover thereof partially removed.

In constructing a package or container according to our invention, the container consists of an inner box part 5, an outer box part or tube 6, a printed or otherwise characterized sheet 7, a transparent protector sheet or covering 8 of "Cellophane" or similar material and a cover proper 9, the latter being used in the shipment and transportation of the package and is removed when the package is placed on a counter, shelf or other support for display.

The box part 5 is formed from a single sheet or strip of heavy paper, cardboard or the like, which is cut, scored and folded to form a top wall 10, a bottom wall 11 and an intermediate wall 12, the top wall 10 joining the bottom wall in a wide side wall 13, whereas the intermediate wall 12 joins the bottom wall 11 in a narrower side wall 14 so that the wall 12 is arranged below and in spaced relation to the wall 10 in the use of the device as clearly seen in Fig. 2 of the drawing.

The edge of the wall 10 opposite the side wall 13 is provided with a depending wall 15, the latter preferably having a tab 16 which is adapted to fold inwardly and rest upon the upper surface of the wall 12 to aid in holding this wall or the end portion thereof provided with the flap or wall 17 against movement in the direction of the wall 10 when the device is in use. The other edges of the walls 10 and 12 are also preferably provided with side wall portions 18 and 19 respectively which serve to give strength and rigidity to the complete box part or unit and to aid in reinforcing the boundary walls of the outer box part 6. The box part 6 is in the form of a square tube or sleeve which fits snugly over the inner box part and the members associated therewith to hold the complete package in position.

Adjacent the corner portions of the walls 10 and 11 are H-shaped die cuts 20 and 21 respectively which form pairs of opposed and depending flaps 22, 23 and rectangular openings for receiving a group of vertically disposed candles 24. The die cuts 20, 21 are arranged upon the walls 10 and 12 so as to be in vertical alinement to support the candles with the lower ends thereof resting upon the bottom wall 11 as clearly seen at the right of Fig. 2 of the drawing, and with the upper ends of the candles projecting into the display chamber or compartment 25 within the outer box part 6 and above the top wall 10.

Around each of the slits or cuts 20, 21 are circumferentially spaced X-slits 26, 27 respectively to permit the passage of the wire stems 28 of candle holders through both walls 10, 12 in a definite spaced relationship, said candle holders having floral heads 29 arranged in the chamber 25 above the top wall 10.

The printed or otherwise characterized sheet 7 will also be apertured to register with the openings for the groups of candles 24 and have printed markings similar to the X-slits for guiding the placement of the stems 28 in the slits 26, 27. The sheet 7 may also be characterized to locate various kinds and classes of cake ornaments or decorations upon the upper surface thereof as indicated at 30 in Fig. 1 of the drawing, and some of which may also be seen in Fig. 2 of the drawing. These decorations 30 are in the form of alphabetic letters, flowers, birds and the like suitable for decorating cake, and may be of any desired construction but preferably are made of a sugar composition containing suitable coloring, and these ornaments may be of any desired color combination.

Figure 2:
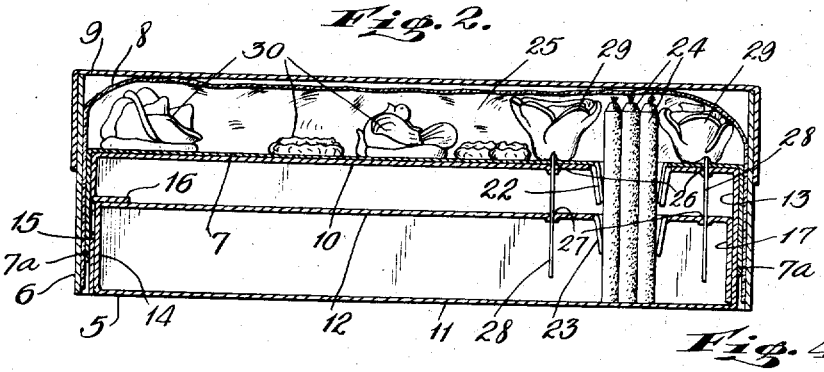
Fig. 2 is a section on the line 2—2 of Fig. 1 on an enlarged scale and showing the cover in closed position.

In assembling the package after the inner box part has been folded into position substantially similar to that shown in Fig. 2 of the drawing, the sheet 7 is then arranged thereon in proper registering position, the ends of the sheet passing downwardly over the sides of the part 5 as indicated at 7a, after which the candle holders and candles are placed in position. The decorations or ornaments may previously have been applied to the sheet 7, the same adhering to the sheet by the consistency of the material employed in the form thereof, and are thus retained against displacement on said sheet. The next operation consists in placing the transparent sheet 8 over the top of the package thus formed with the side edges of the sheet extending downwardly over the sides of the part 5 after which the outer box part 6 is slid over the top of the package, in which operation, the sheets 7 and 8 are retained between adjacent walls of the inner and outer box parts and the sheet 8 will serve to prevent accidental displacement of the candles and candle holders if the package should be subjected to excessive shock or vibration, it being understood that these devices are normally frictionally retained in position. The cover 9 is then applied to the top of the package and the same is now ready for shipment. When placed on display, the cover 9 is removed and the resulting package will have all of the articles of merchandise clearly visible through the upper open end thereof within the compartment 25, the transparent sheet serving as a window, and further, as a means for preventing dust and dirt from collecting upon the merchandise.

Figure 3:
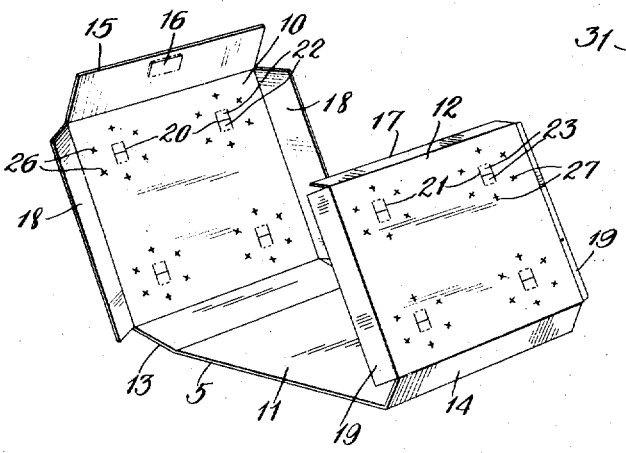
Fig. 3 is a perspective view of an inner box part which we employ showing the same in a partially extended or inverted position; and, Fig. 4 is a plan view showing a different arrangement of merchandise in a container of the general structure shown in Figs. 1 to 3 inclusive.
Figure 4:
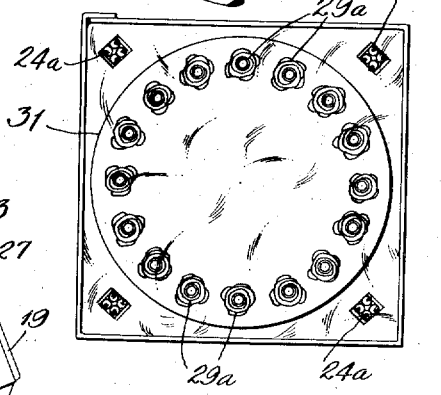

In Fig. 4 of the drawing, we have shown a modification which consists simply in a different arrangement of the H-slots 20, 21 and of the X-slits 26, 27. With this construction, the candles 24a are supported at the corner portions of the package outwardly of a printed or otherwise circular representation 31 of a cake which is formed upon the upper surface of a sheet similar to the sheet 7, and the X-slit identifications are arranged inwardly of the circle 31 and in position to correspond with an arrangement of X-slits so as to support candle holders or the floral heads 29a thereof in a circular arrangement around the cake representation. For purposes of simplification, the other ornaments or displays such as 30 are eliminated in Fig. 4 of the drawing, but it will be understood, however, that these may be arranged upon the cake representation to clearly visualize and demonstrate to the purchaser a possible arrangement or manner of display, and these may be varied in the different packages, not only as to the types of displays employed, but also with respect to the color combinations. Aside from the foregoing, the structure of the package shown in Fig. 4 will be identical with that shown in Figs. 1 to 3 inclusive, the various parts or box members being of the same general construction and assembled in a similar manner. In this connection, it will be apparent that different arrangements of the slits or cuts 20, 21 and the X-slits 26 and 27 may be provided to produce different types of displays at the open end of the resulting package.

In the construction shown in Figs. 1, 2 and 4, the floral heads 29, 29a of the candle holders are supported inwardly of the boundary walls of the outer box part so that in shipment, transportation and other handling, the danger of destruction of these heads is substantially eliminated. The other ornaments being fixed upon their supporting sheet are held against displacement and are also arranged within the boundaries of the box so as to be protected from direct shocks or blows.

Having fully described our invention, what we claim as new and desire to secure by Letters Patent, is:

1. A candle holder shipping and display package comprising a box part consisting of top, bottom and intermediate horizontal wall parts with side wall parts joining and spacing the horizontal parts, an outer box part fitting snugly upon the side walls of the first named box part, the upper edge of the outer box part projecting above the top wall of the first named box part to form an article display chamber within the upper end of said outer box part, the bottom wall of the first named part forming the bottom of the package, said top and intermediate walls being fashioned at the corner portions thereof to provide means arranged in vertical alinement for supporting candles and candle holders in perpendicular and predetermined grouped positions therein with the upper ends of the candles and candle holders arranged in said chamber, the grouped arrangement of the candles and candle holders being such as to form large display areas on said chamber around said groups, and other cake ornaments arranged in predetermined positions on said display areas.

2. A candle holder shipping and display package comprising a box part consisting of top, bottom and intermediate horizontal wall parts with side wall parts joining and spacing the horizontal parts, an outer box part fitting snugly upon the side walls of the first named box part, the upper edge of the outer box part projecting above the top wall of the first named box part to form an article display chamber within the upper end of said outer box part, the bottom wall of the first named part forming the bottom of the package, said top and intermediate walls being fashioned at the corner portions thereof to provide means arranged in vertical alinement for supporting candles and candle holders in perpendicular and predetermined grouped positions therein with the upper ends of the candles and candle holders arranged in said chamber, said means comprising large apertures having depending flexible walls for receiving and supporting the candles, circumferentially arranged X-slits for receiving the stems of the candle holders, a characterized sheet arranged upon and covering the top wall of the inner box part for supporting other articles, and a transparent sheet arranged above the articles supporting in the package and retaining predetermined articles against accidental displacement from said inner box part.

3. The combination with a box for shipping and displaying cake ornaments and decorations, of an inner box part arranged and fitting snugly within the lower portion of said box, said inner box part having vertically spaced wall members, the uppermost wall member being arranged inwardly of the upper edge of said box to form a supporting and display chamber at the open end of said box, the upper wall member and next adjacent wall member having inwardly of and in spaced relation to the boundary walls of said box, apertures arranged in vertical alinement with each other to receive and support a plurality of candles in abutting and grouped arrangement and in perpendicular position with the upper ends of the candles arranged in said display chamber, and said walls of the inner box part having other vertically spaced perforations for receiving and supporting candle holders in perpendicular position with the ornamented ends of the candle holders disposed in said display chamber.

4. A merchandise package of the class described comprising inner and outer box parts, the inner box part being formed from a single sheet of material folded to form top, bottom and intermediate horizontal walls, the top wall of said inner box part being arranged in spaced relation to the upper edge of the outer box part to form in the top open end of the outer box part an article display chamber, said top and intermediate walls of the inner box part having at least one pair of large apertures arranged in common vertical alinement within the peripheral edges thereof, a single pair of said vertically alined apertures being adapted to receive and support a plurality of grouped candles in vertical position, said top and intermediate walls also having vertically registering slits or cuts for supporting candle holders in vertical position in connection with said inner box part and inwardly of peripheral edges thereof and in spaced relation to the candles supported therein.

5. A merchandise package of the class described comprising inner and outer box parts, the inner box part being formed from a single sheet of material folded to form top, bottom and intermediate horizontal walls, the top wall of said inner box part being arranged in spaced relation to the upper edge of the outer box part to form in the top open end of the outer box part an article display chamber, said top and intermediate walls of the inner box part having large apertures arranged in common vertical alinement within the peripheral edges thereof for receiving and supporting a plurality of grouped candles in vertical position, said top and intermediate walls also having vertically registering slits or cuts for supporting candle holders in vertical position in connection with said inner box part and inwardly of peripheral edges thereof and in spaced relation to the candles supported therein, the candle receiving apertures being disposed at corner portions of the inner box part with the candle holders encircling each group of candles, and means arranged upon the upper surface of the top wall of the inner box part for supporting other decorations within said display chamber and in spaced relation to the candles and candle holders.

6. A candle holder shipping and display package comprising an outer box part and an inner box part insertable within the outer box part, said inner box part having spaced horizontal walls, the top wall of the inner box part being arranged in spaced relation to the upper edge of the outer box part to form in the top open end of the outer box part an article display chamber, another wall of the inner box part being arranged between said top wall and the lower edge of the outer box part, said walls of the inner box part having vertically registering slits or cuts for receiving and supporting candle holders, said slits or cuts being arranged circumferentially in spaced relation to each other and to the wall of the outer box part to support the candle holders in said display chamber in spaced relation to the walls of said outer box part, and said inner box part having an aperture to receive a group of candles within the enclosure of said circumferentially arranged candle holders.

7. A candle holder shipping and display package comprising an outer box part and an inner box part insertable within the outer box part, said inner box part having spaced horizontal walls, the top wall of the inner box part being arranged in spaced relation to the upper edge of the outer box part to form in the top open end of the outer box part an article display chamber, another wall of the inner box part being arranged between said top wall and the lower edge of the outer box part, said walls of the inner box part having vertically registering slits or cuts for receiving and supporting candle holders, said slits or cuts being arranged circumferentially in spaced relation to each other and to the wall of the outer box part to support the candle holders in said display chamber in spaced relation to the walls of said outer box part, said walls of the inner box part having apertures for receiving groups of vertically arranged candles, and means arranged upon the upper surface of said top wall for supporting other decorations within the enclosure of said circumferentially spaced candle holders.

FRANK J. ADDIS.
PAUL P. ADDIS.